(No Model.)

C. SHIELDS.
AIR VALVE.

No. 367,324. Patented July 26, 1887.

Witnesses
John Jolley
F. Norman Dixon.

Christopher Shields,
Inventor
By his Attorneys,
W. C. Strawbridge
J. Bonsall Taylor

UNITED STATES PATENT OFFICE.

CHRISTOPHER SHIELDS, OF PHILADELPHIA, PENNSYLVANIA, ASSIGNOR OF ONE-HALF TO STANLEY G. FLAGG & CO., OF SAME PLACE.

AIR-VALVE.

SPECIFICATION forming part of Letters Patent No. 367,324, dated July 26, 1887.

Application filed March 19, 1887. Serial No. 231,547. (No model.)

*To all whom it may concern:*

Be it known that I, CHRISTOPHER SHIELDS, a subject of the Queen of Great Britain, residing in the city of Philadelphia, State of Pennsylvania, United States of America, have invented a new and useful Improvement in Automatic Air Valves, of which the following is a description, reference being had to the accompanying drawings and the letters of reference marked thereon, which form a part of this specification.

My invention has for its object the provision of an automatic air or vacuum valve suited for use in connection with steam radiators, and for other purposes, and it consists as hereinafter described in the specification and specifically referred to in the claims.

Figure 1:
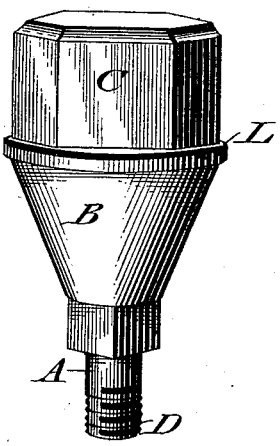
Figure 3:
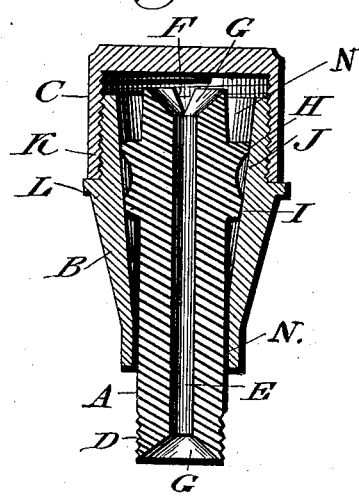
Figure 2:
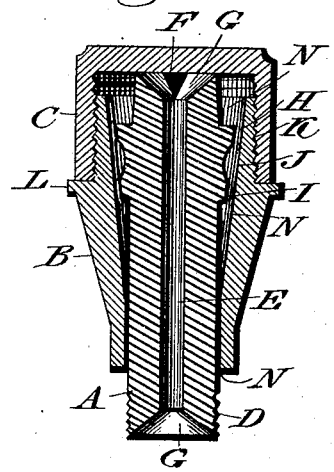
Figure 4:
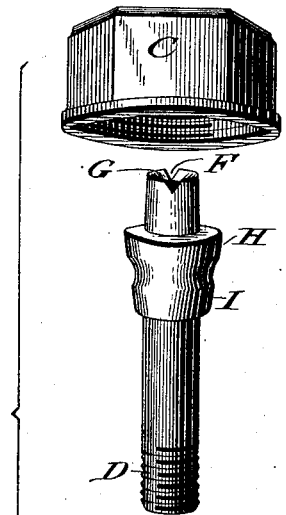

In the drawings, Figure 1 is a view in perspective of a valve embodying my invention, Fig. 2 a central vertical section of the device shown in Fig. 1, the valve being open, Fig. 3 a central sectional elevation of the device shown in Fig. 1, the valve being closed, and Fig. 4 a perspective view, in detail, of the parts of said valve.

My invention, as shown in the drawings, consists essentially of three parts or devices, namely, a vent or escape pipe A, a collar B, and a cap C, the construction, arrangement and operation of which parts I will particularly describe The vent or escape pipe A is, at its lower end D, screw threaded to permit of its being attached to the steam radiator, or other device, in connection with which it is to be used, and it is provided with a central bore or orifice E which, at both its lower and upper ends, terminates in expanded conical openings G G. This pipe is provided at its upper end with notches F which open into and communicate with its bore E, and it is, on its outer surface, and near its upper end, provided with annular rings H I having flat ground faces adapted to rest, when the valve is closed, upon, and in close contact with, the interior conical bearing surface J of the collar B. The collar B is, upon its outer surface, and at its upper end, provided with screw-threads K which at their lower ends terminate at an annular collar or shoulder L.

C is a cap, closed at its upper end, and, upon the inner surface of its wall, provided with screw threads which permit of it being screwed upon the upper end of the collar B and in close and hermetical contact with the shoulder L.

The construction of these parts is such that the collar B, at the cylindrical portion of its bore, surrounds the pipe A loosely and thus provides an annular interspace N. The form and dimensions of the conical portion of the bore of the collar B, the dimensions of the cap C, as well as the dimensions and form of the annular rings H I are such as to provide, when the cap C rests by gravity upon the upper end of the pipe A as shown in Fig. 2, an interspace between the outside surface of the pipe A and the interior surfaces of said collar B and cap C, said interspace being in communication with the notch F of the pipe A.

From the construction described it will be understood that when the valve is applied to a steam radiator, or to other devices, in which the air is of about the same pressure as the outside air, the air within such radiator will be free to escape therefrom through the orifice E, notches F, and interspace N.

From the construction above described it will also be understood that when the pressure of the air contained within the radiator becomes greater than the pressure of the outside air, the cap C will be lifted and the ground surfaces of the annular rings H I be brought into close and hermetical contact with the interior conical bearing surface J of the collar B, by which the valve will be closed and the escape of steam or air from the radiator be prevented. It will likewise be understood that should a vacuum be created in a radiator, or other closed vessel, to which this valve is attached, the cap C would at once, by gravity, fall and rest upon the top of the pipe A, communication be established from the outer air through the valve to the radiator, and the vacuum be destroyed.

In this specification I have used the word cap to denote the part lettered C in the drawings, in the claims I employ the word cap, unless it is otherwise specifically qualified by being coupled with the letter C, to denote the device by which the upper end of the pipe A is inclosed, whether it be made up of the specific parts lettered B and C, or be of a construction different from that in which my invention is, in the drawings, shown as embodied.

Having thus described my invention, I claim:

1. In an automatic air valve, in combination, an air vent or escape pipe provided on its outer surface with a seat and adapted at one end to be attached to a radiator, and a cap contracted at its lower end, which, in its normal position, rests on the top of said pipe,—in which position an air passage exists between the outer air and the radiator,—and which, when lifted, has part of its inner surface in close and hermetical contact with the seat on the outer surface of the inclosed end of said pipe, as specified.

2. In an automatic air valve, in combination, an air vent or escape pipe, provided with a bore or passage, and, at its upper end, provided with notches opening into said bore, and, upon its outer surface, provided with an annular ring or annular rings, and a cap inclosing the upper end of said pipe and said annular ring or rings, said cap having an inverted conical bore, as and for the purpose specified.

3. In an automatic air valve, in combination, a vent or escape pipe A, a collar B, and a cap C, substantially as shown and described and for the purposes set forth.

4. In an automatic air valve, in combination, a vent or escape pipe A provided with a bore E, notches F F, and, upon its outer surface, with annular rings H I, a collar B provided with screw threads K and shoulders L, and a cap C screw threaded upon the inner surface of its wall, all substantially as shown and described and for the purposes set forth.

In testimony whereof I have hereunto signed my name this 17th day of March, A. D. 1887.

CHRISTOPHER SHIELDS.

In presence of—
WM. C. STRAWBRIDGE,
J. BONSALL TAYLOR.